United States Patent [19]

Ebberg

[11] Patent Number: 5,048,120
[45] Date of Patent: Sep. 10, 1991

[54] ARRANGEMENT FOR THE GENERATION OF AN FSK-MODULATED OPTICAL SIGNAL HAVING TWO POLARIZATION STATES THAT ARE ORTHOGONAL TO ONE ANOTHER FROM AN FSK-MODULATED OPTICAL TRANSMITTED SIGNAL

[75] Inventor: Alfred Ebberg, Munich, Fed. Rep. of Germany

[73] Assignee: Siemens Aktiengesellschaft, Munich, Fed. Rep. of Germany

[21] Appl. No.: 560,039

[22] Filed: Jul. 30, 1990

[30] Foreign Application Priority Data

Aug. 28, 1989 [DE] Fed. Rep. of Germany ....... 3928403

[51] Int. Cl.$^5$ .......................................... H04B 10/00
[52] U.S. Cl. ................................... 455/616; 359/122
[58] Field of Search ............... 455/616, 619, 618, 617; 370/2; 350/382, 384, 385, 394

[56] References Cited

U.S. PATENT DOCUMENTS

| | | | |
|---|---|---|---|
| 4,506,388 | 3/1985 | Monerie et al. | 455/616 |
| 4,553,822 | 11/1985 | Mahlein | 350/394 |
| 4,556,292 | 12/1985 | Mathyssek | 350/394 |
| 4,718,120 | 1/1988 | Tseng | 455/616 |
| 4,817,206 | 3/1989 | Calvani et al. | 455/616 |
| 4,888,816 | 12/1989 | Sica, Jr. | 370/2 |

FOREIGN PATENT DOCUMENTS 0190138  7/1989  Japan .................................... 455/616

OTHER PUBLICATIONS

Electronics Letters, 17th Mar. 1988, vol. 24, No. 6, Polarisation-Insensitive Coherent Lightwave System Using Wide-"Deviation FSK and Data-Induced Polarization Switching" pp. 358-360.
Journal of Lightwave Technology, vol. 6, No. 10, Oct., 1988, "Polarization-Switching Techniques for Coherent Optical Communications", I.M.I. Habbab et al., pp. 1537-1548.
Electronics Letters 5th Jan. 1989, vol. 25, No. 1, "Polarisation-Insensitive, 500 Mbit/s FSK Transmission Over 153 km By Passive Polarisation Switching", pp. 4-5.

Primary Examiner—Reinhard J. Eisenzopf
Assistant Examiner—Kinfe-Michael Neghsh
Attorney, Agent, or Firm—Hill, Van Santen, Steadman & Simpson

[57] ABSTRACT

An arrangement is disclosed for the generation of a FSK-modulated optical signal having two polarization states which are orthogonal to each other from a FSK-modulated optical transmitted signal. The arrangement is formed of a polarizing beam splitter which generates from the polarized transmitted signal two signal components with orthogonal polarization states, and which are reflected back into themselves and superimposed via allocated reflectors. Before the superimposing the polarization state of each signal component is converted into a polarization state orthogonal thereto, and thus the optical path lengths between the polarizing beam splitter and the reflectors differ by a certain amount. The arrangement is useful for optical superheterodyne reception.

9 Claims, 4 Drawing Sheets

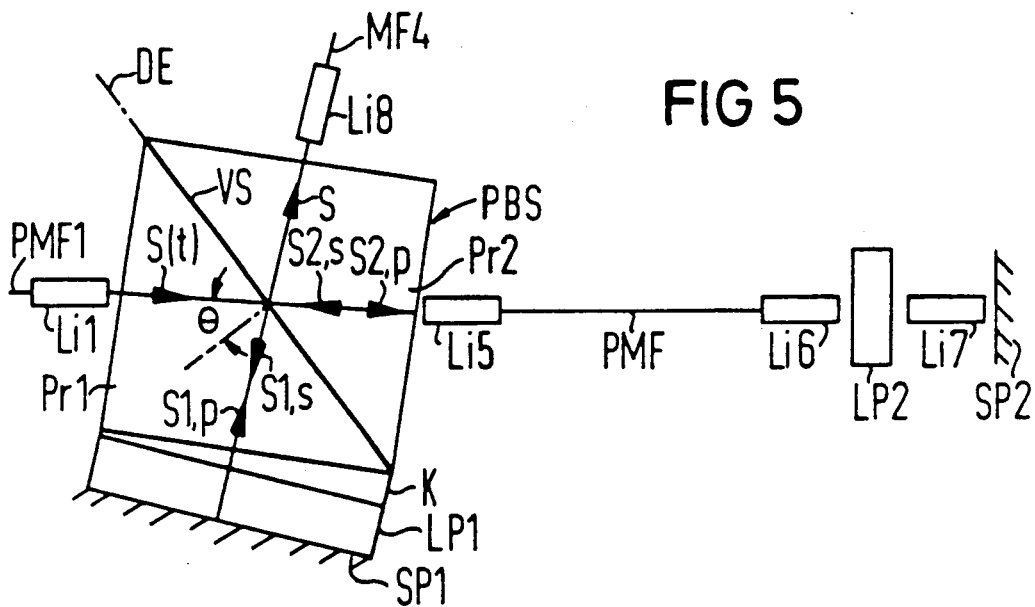
FIG 5
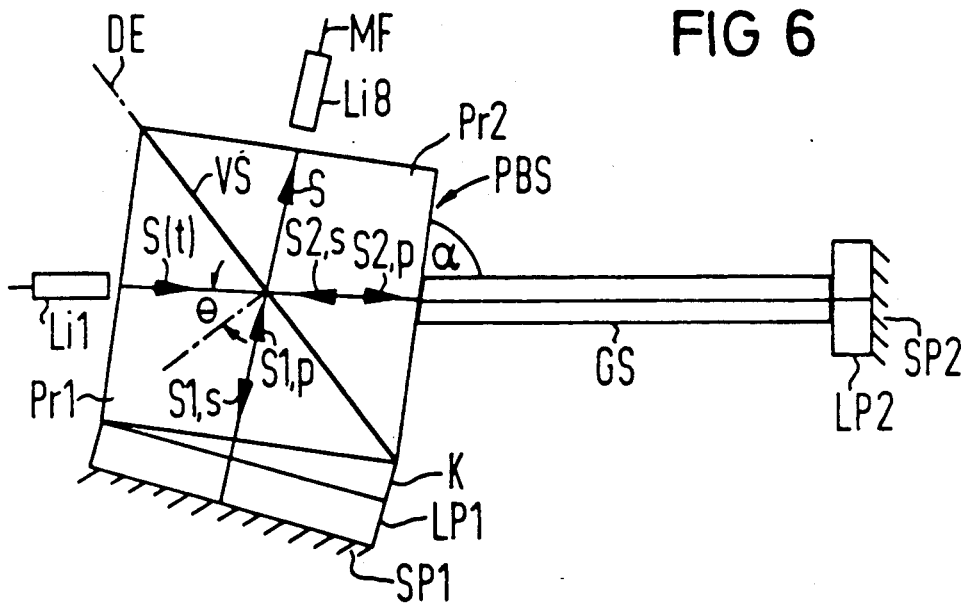
FIG 6
FIG 7
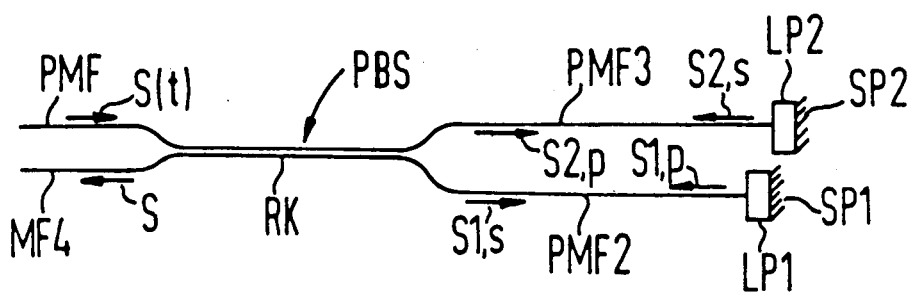

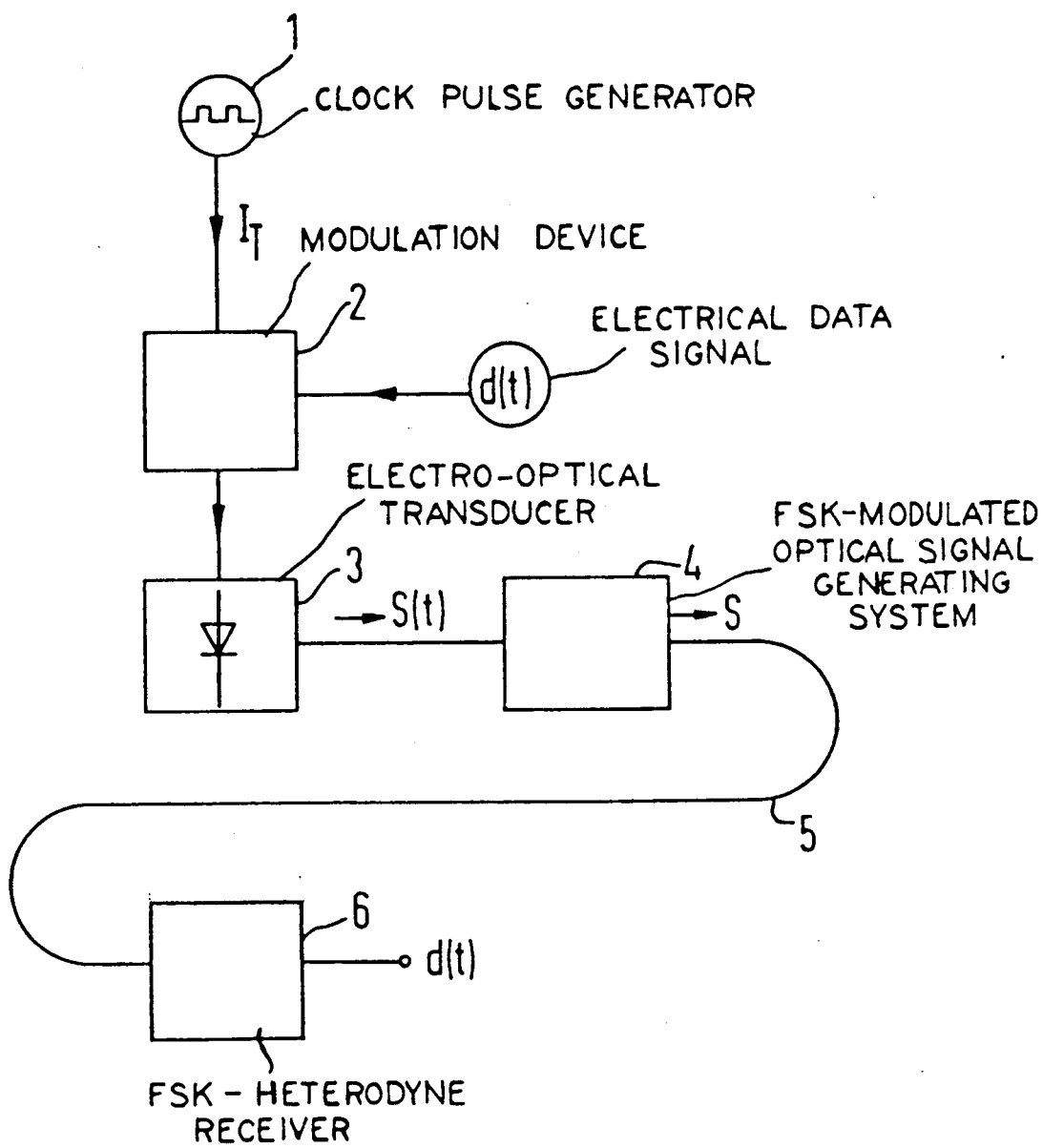

ARRANGEMENT FOR THE GENERATION OF AN FSK-MODULATED OPTICAL SIGNAL HAVING TWO POLARIZATION STATES THAT ARE ORTHOGONAL TO ONE ANOTHER FROM AN FSK-MODULATED OPTICAL TRANSMITTED SIGNAL

BACKGROUND OF THE INVENTION

The invention relates to an arrangement for the generation of an FSK-modulated optical signal with two polarization states that are orthogonal to one another from an FSK-modulated optical transmitted signal.

In an optical transmission system with superheterodyne reception, it is necessary that the local oscillator signal have the same polarization state as the received signal in order to obtain a maximum signal amplitude of the intermediate-frequency signal. Since the birefringence of a conventional monomode fiber is influenced by thermal as well as mechanical disturbances, the polarization state of the received signal fluctuates, which leads to amplitude fluctuation of the intermediate-frequency signal. In the event that the local oscillator signal and the received signal are polarized in orthogonal fashion to one another, the intermediate-frequency signal disappears completely.

A reception independent of polarization is possible if the optical signal supplied to the receiver has polarization states which are orthogonal to each other. Such a signal can be generated from the transmitted signal, e.g. via a polarization switch controlled by the data signal to be transmitted (see German patent application P 38 33 273.6 or German patent application P 38 33 274.4, both incorporated herein by reference).

A method of this type is suitable for all known digital methods of modulation, i.e. ASK-, DPSK- and FSK-modulation. However, additional electronic units are necessary in order to control the polarization switch. Furthermore, for each optical transmitter a switch with corresponding control electronics must be provided in a multichannel system.

In an optical transmission system for FSK-modulated optical transmitted signals a polarization change can be caused by this signal itself. For this, it must go through a suitable birefringent medium first before the actual transmission via the fiber. The literature suggests the use of a polarization-maintaining fiber of suitable length (see Electron. Lett. 25, 1989, p. 4-5, incorporated herein by reference). If one couples into this fiber the FSK-modulated signal under 45 degrees relative to the principal/main axes of the polarization maintaining fiber, a signal is obtained at the fiber output with polarization states which are orthogonal to each other and which are changed over synchronously to the modulation. Given a frequency deviation of e.g. $\Delta f = 1$ GHz compared to the basic frequency $f_o$ of the modulated optical signal and a fiber birefringence of $B = 5 \cdot 10^{-4}$, a fiber of approximately 300 m length must be used.

Another possibility to generate an FSK-signal with orthogonal polarization states is suggested in the literature proposing to use a Mach-Zehnder-interferometer (see IEEE J. Lightwave Technol. LT6 (1988), p. 1537-1548, incorporated herein by reference). In order to generate orthogonal polarization states given a frequency deviation $\Delta f$ of the FSK-modulated transmitted signal at the interferometer output, the optical path difference $\Delta l$ between the arms of the interferometer must be equal to $c/2 \Delta f$, whereby c is the light velocity. This interferometer requires two polarizing beam splitters and its adjustment involves great expense.

SUMMARY OF THE INVENTION

An object of the invention is to specify an arrangement for the generation of an FSK-modulated optical signal with two orthogonal polarization states from an FSK-modulated transmitted signal for the realization of such an optical superheterodyne reception for this signal which is independent of the polarization, and wherein only one polarizing beam splitter is necessary, and which can be manufactured as a compact structure.

In a system of the invention, a polarizing beam splitter divides the transmitted signal into first and second orthogonal polarized signal components. First and second reflectors reflect the orthogonal polarized signal components back onto themselves back towards the polarizing beam splitter. The reflector means includes means for changing the original polarization state of the respective signal component into a polarization state orthogonal thereto. An optical path link between the polarizing beam splitter and the and the reflector allocated to one of the signal components and an optical path link between the polarizing beam splitter and the reflector allocated to the other signal component is selected such that they are different from one another wherein the amount of a difference between these is $c/4 \Delta f$, where c is the light velocity and $\Delta f$ is an optical frequency deviation contained in the FSK-modulated transmitted signal.

The arrangement of the invention is based on a Michelson-interferometer.

A great advantage of the invention is that it can be used in a multichannel system for several channels simultaneously, if all the channels have the same frequency deviation $\Delta f$.

BRIEF DESCRIPTION OF THE DRAWINGS

FIGS. 2 through 6 show various embodiments of the arrangement according to FIG. 1;

FIG. 7 illustrates the basic structure of an arrangement according to the invention with a polarization-selective optical directional coupler as a polarizing beam splitter; and FIG. 8 illustrates an optical transmission system for superheterodyne reception of FSK-modulated optical transmitted signals with an arrangement according to the invention which is insensitive to polarization.

DESCRIPTION OF THE PREFERRED EMBODIMENTS

Figure 1:
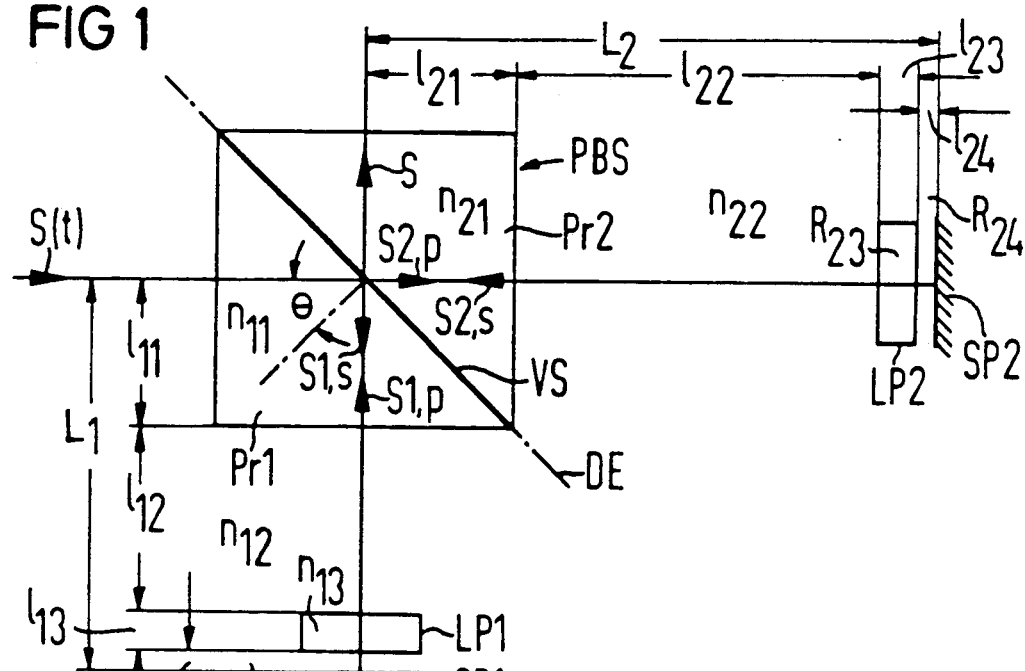
FIG. 1 shows a basic structure of an arrangement according to the invention whereby the polarizing beam splitter is formed of a dielectric multiple layer.

In the exemplary embodiments according to FIGS. 1 through 6, the polarizing beam splitter PBS is formed of a known dielectric multiple layer VS arranged between two glass prisms Pr1 and Pr2. The two glass prisms Pr1 and Pr2 together constitute e.g. a cuboid or cube. The multiple layer VS is arranged in a diagonal plane DE of this cuboid which, in FIGS. 1 through 6 for example, resides vertically on the plane of projection.

The polarized optical transmitted signal S(t) is guided to the polarizing beam splitter PBS, for example horizontally from the left. It penetrates in undeflected fashion into the prism Pr1 and falls on the multiple layer VS under an angle of incidence of $\theta = 45°$. This transmitted signal S(t) must be polarized in linear fashion and is coupled in under 45° to the principal axes of the PBS, so that the light power output is distributed evenly on both branches.

The polarization component of the e.g. linearly polarized transmitted signal S(t), which is vertical to the plane of incidence lying in the plane of projection in FIGS. 1 to 6, is marked with an s so that the polarization component which is parallel to this plane of incidence is marked with a p.

At the dielectric multiple layer VS, a signal component S1 of the transmitted signal S(t) is reflected vertically towards the bottom. It is polarized corresponding to the polarization component s. Another signal component S2, which is polarized corresponding to the polarization component p, goes through that layer VS and subsequently expands horizontally towards the right in undeflected fashion.

The reflected s-polarized signal component S1 falls on the reflector SP1 allocated to this component and is there reflected back in itself. Thus, this signal portion S1 penetrates a quarter-wave length plate LP1, which causes a turn of the original s-polarization of this signal portion S1 into a p-polarization. Accordingly, the signal portion S1 which returns to the dielectric multiple layer in the direction vertically towards the top is p-polarized. It goes through this multiple layer VS and subsequently expands in the direction vertically towards the top. The p-polarized other signal component S2 falls on the reflector SP2 allocated to it and is there reflected back in itself. Also this signal portion S2 thereby penetrates twice a quarter wave length plate LP2 allocated to it which causes a turn of the original p-polarization of this signal portion S2 into a s-polarization. Thus, the other signal portion S2 returning back to the multiple layer VS in the direction horizontally towards the left is s-polarized and is reflected there vertically towards the top. The p-polarized signal portion S1 that penetrated the multiple layer Vs and the s-polarized other signal portion S2 reflected there superimpose to the optical signal S, which has the two orthogonal polarization states s and p.

The superimposed signal portions S1 and S2 are chronologically shifted relative to one another, which is given by the double amount $2|L_2-L_1|$ of a difference between the optical path length L2 between the polarized beam divider PBS and the allocated reflector SP2 and the optical path length L1 between the polarizing beam splitter PBS and the allocated reflector SP1.

The amount $|L_2-L_1|$ is to be selected equal to $c/4\Delta f$, whereby c is the vacuum light velocity and $\Delta f$ the optical frequency deviation of the FSK-modulated transmitted signal S(t).

For example, the linearly polarized FSK-modulated optical transmitted signal S(t) can be a signal of the shape $$S(t) = A_o \cdot \cos(2\pi f_o + \Delta f \cdot d(t)) + \theta_o)$$

whereby $A_o$ is a signal amplitude, $f_o$ a basic frequency of the optical wave, $\Delta f$ a cited frequency deviation, d(t) a digital electrical data signal, and $\theta_o$ a phase.

The optical path length L2 or L1 between the polarizing beam splitter PBS and the allocated reflector SP2 or SP1 is generally defined by $$L2 = \sum_{k=1}^{m} l_{2k} \cdot n_{2k}$$

$$L1 = \sum_{j=1}^{q} l_{1j} \cdot n_{1j}$$

whereby, in the first case the respective signal component S2 or S1 proceeds in one direction through m successive optical media with respectively one allocated geometrical length $l_{2k}$ and allocated refractive index $n_{2k}$, and in the second case through q successive optical media with respectively one allocated geometrical length $l_{1j}$ and allocated refractive index $n_{1j}$. Accordingly, the following equation generally applies:

$$c/4\Delta f = \left(\sum_{k=1}^{m} l_{2k} \cdot n_{2k}\right) - \left(\sum_{j=1}^{q} l_{1j} \cdot n_{1j}\right).$$

In the case of FIG. 1, for example, $m=q_{14}=4$ applies. If one, continues with $n_{11}=n_{21}$, $n_{12}=n_{14}=n_{22}=n_{24}=n$, and $n_{13}=n_{23}$, as well as $l_{11}=l_{21}$, $l_{13}=l_{23}$, and $l_{14}=l_{24}$, then $$|l_{22}-l_{12}|n = c/4 \Delta f$$

must be selected. This is equivalent to $$|L_2-L_1| = c/n4\Delta f.$$

whereby $$L_2 = \sum_{k=1}^{4} l_{2k} \text{ and } L_1 = \sum_{j=1}^{4} l_{1j}$$

Given $n=1$, a given free beam propagation applies $|L_2-L_1|=c/4\Delta f$.

The thickness of the quarter wave length plates LP1 and LP2 is given by the optical basic frequency $f_0$.

Figure 2:
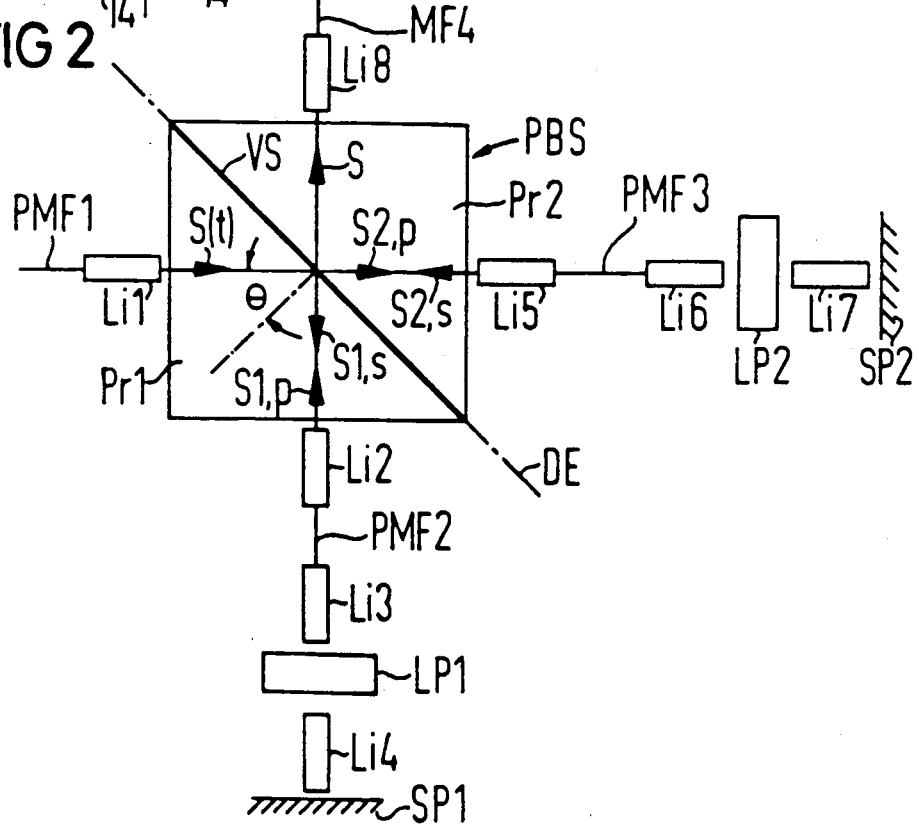

The exemplary embodiment according to FIG. 2 differs from that of FIG. 1 in that the transmitted signal S(t) the signal component S1 and S2 and the optical signal S are guided outside of the polarizing beam splitter PBS in monomode light fibers PMF1, PMF2, PMF3 or PMF4, whereby the fibers PMF1, PMF2, and PMF3 must be polarization-conserving fibers. The fiber PMF4 can be a conventional fiber. The in- and out-coupling of the optical waves in or out of the fibers PMF1 to PMF3 and PMF4 occurs via lenses Li1 to Li8, which can be gradient lenses or spherical lenses.

Figure 3:
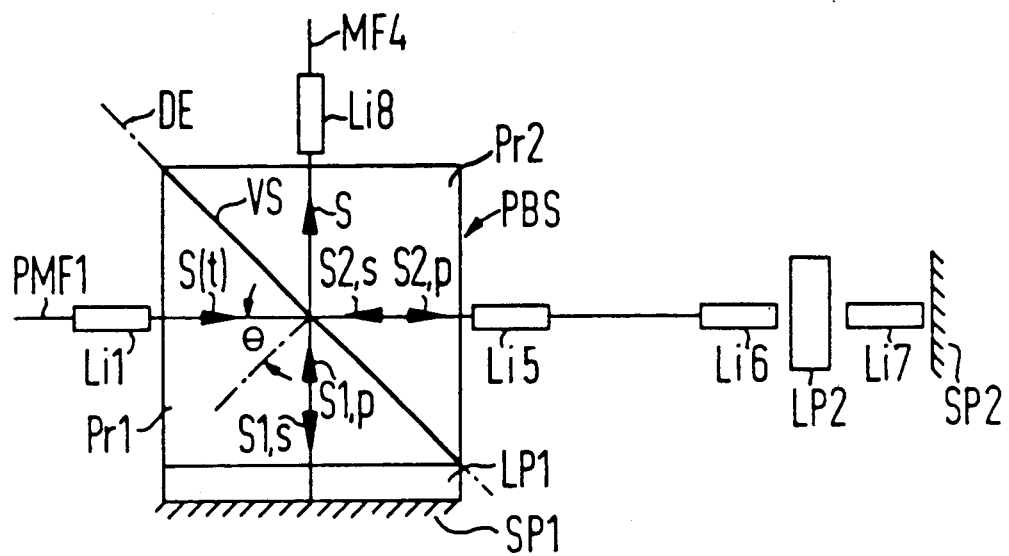

The exemplary embodiment according to FIG. 3 differs from that of FIG. 2 in that e.g. the fiber PMF2 between the polarizing beam splitter PBS and the reflector SP1 is dropped. Instead, a quarter wavelength plate LP1 that is reflection coated on one side is glued directly on the prism PR1. The fiber PMF3 can be dropped just as well.

Figure 4:
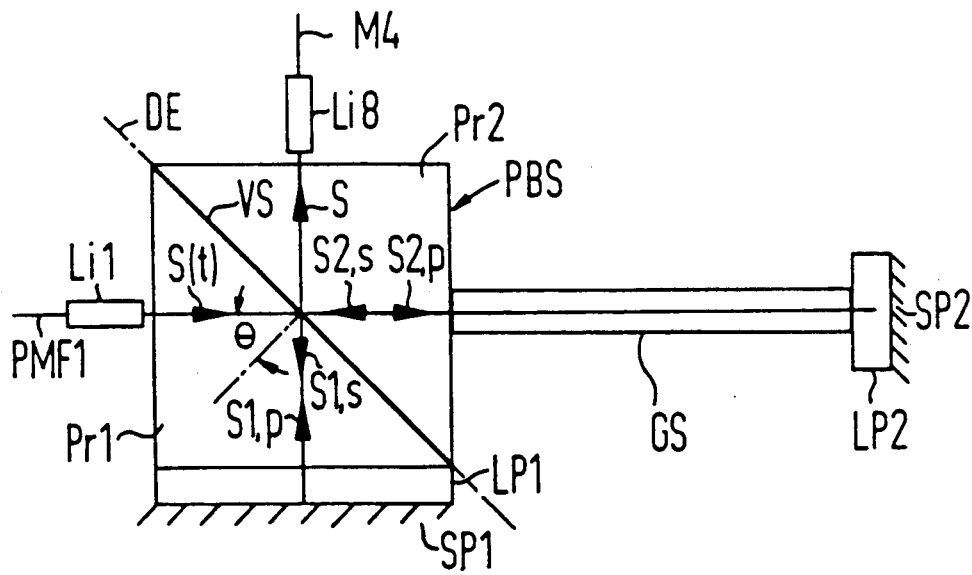

The exemplary embodiment according to FIG. 4 differs from the example of FIG. 3 in that instead of the fiber PMF3 between the polarizing beam splitter PBS and the reflector SP2, a glass bar GS of suitable length e.g. a quartz glass bar is used. Directly on this glass bar GS a quarter wavelength plate LP2 that is reflection coated on one side can be glued.

For preventing reflections from interfaces between two media of different refractive index, these interfaces can be antireflection coated. Furthermore, a tilting of the polarizing beam splitter PBS can make sure that possibly still existing residual reflections do not appear in a disturbing fashion.

Exemplary embodiments with such a tilted polarizing beam splitter PBS are shown in FIGS. 5 and 6. The exemplary embodiment according to FIG. 5 thereby corresponds to the example according to FIG. 3 and the example of FIG. 6 to the example of FIG. 4. The wedge K arranged between the polarizing beam splitter PBS and the quarter wavelength plate LP1 is necessary in the exemplary embodiments according to the FIGS. 5 and 6 and must be dimensioned such that the signal component S1 falls vertically on the reflector SP1 and can be reflected back in itself. This wedge K could also be arranged between the reflector SP1 and the quarter wavelength plate LP1. The wedge K can be reflection coated on one side.

The exemplary embodiment according to FIG. 6 provides that the angle between the glass bar GS and the polarizing beam splitter PBS is to be designed such that the signal component S2 falls vertically on the reflector SP2 and is thus reflected back in itself.

In the exemplary embodiments of FIGS. 5 and 6 the angle of incidence $\theta$ is smaller than 45°.

In the exemplary embodiment of FIG. 7, which corresponds to that of FIG. 2, the polarizing beam splitter PBS is formed of a polarization-selective optical directional coupler RK, which can be an integrated optical directional coupler or a fiber directional coupler, for example. Directional couplers of this type are known.

The optical transmission system of FIG. 8 for heterodyne reception, which is insensitive to polarization, of FSK-modulated optical transmitted signals with an arrangement according to the invention is composed of a clock pulse generator for the generation of electrical clock pulses $I_T$ with the clock period TB. These are supplied to a modulation device 2 just like the electrical data signal d(t). The electrical signal at the output of the modulation device 2 is supplied to an electro-optical transducer 3, for example a laser diode, which converts this electrical signal into an optical, e.g. linearly polarized FSK-modulated transmitted signal S(t). This transmitted signal S(t) is supplied to the signal generating system of the invention which can be designed according to one of the above described exemplary embodiments of FIGS. 1 through 7. At one output of this arrangement 4, a FSK-modulated optical signal S with orthogonal polarization states is output which is supplied via an optical transmission link 5 to a FSK-heterodyne receiver 6 at whose output the electrical data signal d(t) can be obtained. Due to the system 4, this data signal d(t) is independent of polarization.

Although various minor changes and modifications might be proposed by those skilled in the art, it will be understood that I wish to include within the claims of the patent warranted hereon all such changes and modifications as reasonably come within my contribution to the art.

I claim as my invention:

1. A system for generation of a FSK-modulated optical signal having first and second polarization states which are orthogonal to each other from a FSK-modulated optical transmitted signal for polarization independent optical super heterodyne reception of the FSK-modulated optical transmitted signal, comprising:

polarizing beam splitter means for dividing the transmitted signal into first and second orthogonal polarized signal components;

first and second reflector and polarization modification means for reflection the respective first or second signal component back on itself back towards the polarizing beam splitter means and for changing an original polarization state of the respective signal component into a polarization state orthogonal thereto; and a first optical path length between the polarizing beam splitter means and the first reflector and polarization modification means allocated to the first signal component and a second optical path length between the polarizing beam splitter means and the second reflector means allocated to the second signal component being selected different from one another such that an amount of said difference equals c/4 $\Delta$f, where c is the light velocity and $\Delta$f is an optical frequency deviation contained in the FSK-modulated transmitted signal.

2. A system according to claim 1 wherein the polarizing beam splitter means has a dielectric multiple layer.

3. A system according to claim 1 wherein the polarizing beam splitter means comprises a polarization-selective optical directional coupler.

4. A system according to claim 1 wherein said first and second reflector and polarization modification means comprises a quarter wavelength plate penetrated by the respective first or second signal component.

5. A system according to claim 4 wherein said first and second reflector and polarization modification means further includes a reflector associated with the respective quarter wavelength plate.

6. A system according to claim 1 wherein at least one of the first and second reflector and polarization modification means comprises a quarter wavelength plate which is reflection coated on one side.

7. A system according to claim 1 wherein said polarizing beam splitter means comprises first and second glass prisms separated by a diagonal planar dielectric multiple layer, and wherein the polarized optical transmitted signal has an angle of incidence of approximately 45° relative to said diagonal plane.

8. A system for generation of a FSK-modulated optical signal having first and second polarization states which are orthogonal to each other from a FSK-modulated optical transmitted signal for polarization independent optical super heterodyne reception of the FSK-modulated optical transmitted signal, comprising:

polarizing beam splitter means for dividing the transmitted signal into first and second orthogonal polarized signal components;

first and second reflector and polarization modification means for reflecting the respective first or second signal component back on itself back towards the polarizing beam splitter means and for changing an original polarization state of the respective signal component into a polarization state orthogonal thereto;

a first optical path length between the polarizing beam splitter means and the first reflector and polarization modification means allocated to the first signal component and a second optical path length between the polarizing beam splitter means and the second reflector means allocated to the second signal component being selected different from one another such that an amount of said difference equals $c/4 \Delta f$, where c is the light velocity and $\Delta f$ is an optical frequency deviation contained in the FSK-modulated transmitted signal; and a polarization preserving fiber being introduced between at least one of the first and second reflector and polarization modification means and the polarizing beam splitter means.

9. A system for generation of a FSK-modulated optical signal having first and second polarization states which are orthogonal to each other from a FSK-modulated optical transmitted signal for polarization-independent optical super heterodyne reception of the FSK-modulated optical transmitted signal, comprising:

polarizing beam splitter means for dividing the transmitted signal into first and second orthogonal polarized signal components;

first and second reflector and polarization modification means for reflecting the respective first or second signal component back on itself back towards the polarizing beam splitter means and for changing an original polarization state of the respective signal component into a polarization state orthogonal thereto; and a first optical path length between the polarizing beam splitter means and the first reflector and polarization modification means allocated to the first signal component and a second optical path length between the polarizing beam splitter means and the second reflector and polarization modification means allocated to the second signal component being selected different from one another such that an amount of said difference is related to $c/4 \Delta f$, where c is the light velocity and $\Delta f$ is an optical frequency deviation contained in the FSK-modulated transmitted signal.

* * * * *